United States Patent [19]

Tyson et al.

[11] 3,892,751

[45] July 1, 1975

[54] ZETA FORM OF QUINACRIDONE

[75] Inventors: Ronald S. Tyson, Piscataway; Leonard Shapiro, East Brunswick, both of N.J.

[73] Assignee: Sun Chemical Corporation, New York, N.Y.

[22] Filed: Aug. 20, 1973

[21] Appl. No.: 389,986

[52] U.S. Cl............... 260/279 R; 8/1 D; 106/288 Q
[51] Int. Cl. .................... C07d 37/22; C07d 37/18
[58] Field of Search ................................ 260/279 R

[56] References Cited
UNITED STATES PATENTS 3,256,285  6/1966  Fuchs et al...................... 260/279 R
3,726,873  4/1973  Hashizume et al.............. 260/279 R

FOREIGN PATENTS OR APPLICATIONS 1,043,677  9/1966  United Kingdom............. 260/279 R

*Primary Examiner*—Donald G. Daus
*Assistant Examiner*—Mary C. Vaughn
*Attorney, Agent, or Firm*—Cynthia Berlow

[57] ABSTRACT

A red pigment comprises linear quinacridone in the zeta crystal phase characterized by an X-ray diffraction pattern exhibiting six strong lines corresponding to interplanar spacings of 14.06A, 6.38A, 3.45A, 3.35A, 3.11A, and 2.11A; and six weak lines with interplanar spacings of 7.05A, 4.35A, 3.91A, 3.59A, 3.18A, and 2.83A.

1 Claim, No Drawings

ZETA FORM OF QUINACRIDONE

This invention relates to improved quinacridone pigments. More specifically it relates to a new crystalline form of quinacridone and to a process for producing it.

It is known that linear trans quinacridone which is represented by the structural formula

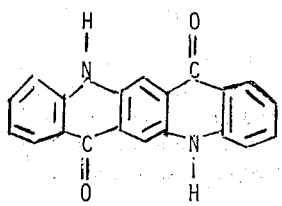

can be produced as pigments in a variety of crystal forms which exhibit different X-ray diffraction patterns. Examples of these include 1. alpha phase, defined in U.S. Pat. No. 2,844,484 as characterized by three strong lines with interplanar spacings of 14.24A, 3.46A, and 3.19A; two lines of moderate intensity with interplanar spacings of 6.32A and 7.13A; two weak lines with interplanar spacings of 5.30A and 4.27A. This is stated to be a bluish red pigment of excellent strength and intensity.

II. beta phase, defined in U.S. Pat. No. 2,844,485 as characterized by two strong lines at interplanar spacings of 15.23A and 3.31A and three lines of lesser intensity at interplanar spacings of 7.55A, 5.47A, and 4.06A. This is a stated to be a violet pigment of excellent intensity and strength.

III. gamma phase, defined in U.S. Pat. No. 2,844,581 as characterized by three strong lines at interplanar spacings of 13.58A, 6.41A, and 3.37A and four relatively weak lines at interplanar spacings of 6.70A, 5.24A, 4.33A, and 3.74A. This is stated to be a bluish red pigment of excellent strength and intensity.

IV. delta phase, defined in U.S. Pat. No. 3,272,821 as characterized by three strong lines at interplanar spacings of 13.6A, 6.75A, and 6.41A; three moderate lines at interplanar spacings of 6.63A, 3.37A, and 3.34A; and weak lines at 5.23A, 4.36A, 4.11A, 3.74A, 3.55A, 3.18A, 3.12A, 2.95A, and 2.81A. This is stated to be a reddish pigment.

V. epsilon phase, defined in Japanese Pat. No. 69-22420 as characterized by three strong lines at interplanar spacings of 26.4A, 13.7A, and 6.5A; two moderate lines at interplanar spacings of 13.3A and 13.1A; and weak lines at interplanar spacings of 25.1A, 23.7A, 20.4A, and 16.9A. This is stated to be a red pigment of brilliant yellowish shade.

Crude quinacridones have little color value and must be altered to a suitable form to develop the desired pigmentary properties. This process, known as conditioning, is generally carried out by grinding or milling, usually in the presence of a solvent. U.S. Pat. No. 2,844,484, for example, discloses the dry milling of linear quinacridones with an inorganic salt such as sodium chloride; U.S. Pat. No. 2,844,485 discloses milling with an inorganic salt in the presence of an aromatic hydrocarbon or halogenated aromatic hydrocarbon liquid; U.S. Pat. No. 2,844,581 discloses salt milling with dimethyl formamide; U.S. Pat. No. 3,272,821 discloses subliming the crude product in a vacuum of 0.05–0.1 mm. Hg at a temperature of 405°–480°C.

It has now been found that there exists a further crystal modification of quinacridone which will be referred to in the following as zeta-phase quinacridone which differs from the known crystalline forms of quinacridone and its derivatives both in shade and in purity of color.

The zeta phase of quinacridone is characterized by strong lines at 14.06A, 6.38A, 3.45A, 3.35A, 3.11A, and 2.11A and weak lines at 7.05A, 4.35A, 3.91A, 3.59A, 3.18A, and 2.83A. In hue this product is a brilliant red pigment of excellent strength and intensity. In properties this product demonstrates the resistance to light, acids, alkalies, and solvents which characterizes the previously known crystal varieties of linear trans quinacridones.

In accordance with the practice of this invention, the crude linear quinacridone is conditioned by adding the presscake to an organic or inorganic liquid or water-soluble solid having at least one hydroxyl group, such as for example ethanol, glycerine, ethylene glycol, diethylene glycol, phenol, o-cresol, o-chlorophenol, boric acid, phosphoric acid, sulfuric acid, oxalic acid, formic acid, acetic acid, citric acid, toluene sulfonic acid, xylene sulfonic acid, and the like, and mixtures thereof. The amount of the conditioning agent employed varies with the agent selected.

The resulting slurry is refluxed for about 2 to 6, and preferably about 4, hours; filtered; and washed with water. If desired, the resulting pigment may be dried at about 60° to 90°, and preferably at about 70°, C.

The new zeta-phase quinacridone gives an X-ray diffraction pattern which shows that the crystal structure is entirely different from those of the known quinacridone pigments. While this new crystalline form shows some X-ray spacings similar to the known forms, there are many intense and weak lines that do not correspond to those of the known alpha-, beta-, gamma-, delta- and epsilon-forms of quinacridone, as shown in the following table:

| Zeta-phase Quinacridone Pigment | α | β | γ | Δ | ε |
|---|---|---|---|---|---|
| 14.06s | 14.24* | 15.23* | 13.58s | 13.6s | 13.6s |
| 7.05w | 7.13m | 7.55m | 6.70m/w | 6.75s | 6.76m |
|  |  |  |  |  | 6.66m |
| 6.38s | 6.32m |  | 6.41s | 6.41s | 6.47s |
| 4.35w | 4.27w | 4.06m | 4.33m/w | 4.36w | 5.25w |
| 3.91w |  |  |  |  | 4.35w |
|  |  |  | 3.74m/w | 3.74w | 3.75w |
| 3.59w |  |  |  | 3.55w | 3.52w |
| 3.45s |  | 3.46s |  |  | 3.38s |
| 3.35s |  | 3.31s | 3.37s | 3.34m |  |
| 3.18w | 3.19s |  |  | 3.18w |  |
| 3.11s |  |  |  | 3.12w |  |
| 2.83w |  |  |  | 2.81w |  |
| 2.11s |  |  |  |  |  | s= strong, m= moderate, w= weak

The method of preparing the crude quinadridone is not critical. In general, however, it is convenient to prepare it by the ring closure in polyphosphoric acid of 2,5-dianilinoterephthalic acid or ester thereof and striking the resulting solution into water, as described in U.S. Pat. Nos. 3,257,405, and 3,342,823.

Compared to other quinacridone crystalline types of similar shade, the product of this invention is stronger, cleaner, and more convenient and economical to produce. The present process eliminates the need for grinding equipment to change the crystal phase of the quinacridone.

The product of this invention is used advantageously in all major areas of pigment application, such as inks, paints, plastics, and textiles.

The following examples which are set forth to describe the preferred embodiments illustrate in further detail the invention and the manner in which this new crystalline form of quinacridone may be prepared and used as a pigment.

EXAMPLE 1

A 100 Parts of polyphosphoric acid (115% as $H_3PO_4$) were thoroughly mixed with 20 parts of 2,5-dianilinoterephthalic acid; the mixture was heated with agitation to 85°C. for about 24 hours. The reaction mixture was then cooled; when the temperature was below 65°C., 10 parts of water were added gradually with stirring; the mass was then drowned into an additional 700 parts of water, precipitating a crude quinacridone.

B. 100 Parts of the crude presscake of part (A) were added to about 44 parts of sulfuric acid to adjust the acid concentration to 35 per cent, exclusive of the pigment. The resulting slurry was refluxed for 4 hours, filtered, and washed with water. 12 Parts of red quinacridone were obtained.

The linear quinacridone product was crystalline and exhibited the typical X-ray diffraction pattern of the zeta phase.

It is entirely different from the forms of quinacridone that have been described previously. Because of its high strength and cleanliness, this new form is a superior red pigment particularly suited for use in printing inks, paints, plastics, and textiles.

EXAMPLE 2

The procedure of Example 1 (B) was repeated with each of the following conditioning agents instead of sulfuric acid: ethylene glycol, phenol, o-chlorophenol, acetic acid, formic acid, citric acid, and toluene sulfonic acid. The results were comparable.

What is claimed is:

1. A red pigment consisting of linear quinacridone in the zeta crystal phase characterized by an X-ray diffraction pattern exhibiting six strong lines corresponding to interplanar spacings of 14.06A, 6.38A, 3.45A, 3.35A, 3.11A, and 2.11A and six weak lines with interplanar spacings of 7.05A, 4.35A, 3.91A, 3.59A, 3.18A, and 2.83A.

* * * * *